United States Patent
Takahashi et al.

(10) Patent No.: US 10,121,497 B1
(45) Date of Patent: Nov. 6, 2018

(54) MAGNETIC RECORDING HEAD WITH SPIN TORQUE OSCILLATOR LAYERS SATISFYING WIDTH, THICKNESS AND ANGLE RELATIONSHIP FORMULAS

(71) Applicant: TDK Corporation, Tokyo (JP)

(72) Inventors: Hirokazu Takahashi, Tokyo (JP); Zhengyao Tang, Tokyo (JP); Tetsuya Roppongi, Tokyo (JP); Shinji Hara, Tokyo (JP)

(73) Assignee: TDK Coporation, Tokyo (JP)

( * ) Notice: Subject to any disclaimer, the term of this patent is extended or adjusted under 35 U.S.C. 154(b) by 0 days.

(21) Appl. No.: 15/730,845

(22) Filed: Oct. 12, 2017

(51) Int. Cl.
*G11B 5/235* (2006.01)
*G11B 5/31* (2006.01)
*G11B 5/127* (2006.01)
*G11B 5/00* (2006.01)

(52) U.S. Cl.
CPC .......... *G11B 5/3146* (2013.01); *G11B 5/1278* (2013.01); *G11B 5/235* (2013.01); *G11B 5/314* (2013.01); *G11B 5/3116* (2013.01); *G11B 2005/0024* (2013.01)

(58) Field of Classification Search
None
See application file for complete search history.

(56) References Cited

U.S. PATENT DOCUMENTS

| 9,001,465 | B1* | 4/2015 | Shimizu et al. ..... G11B 5/3146 360/125.3 |
| 9,558,765 | B2 | 1/2017 | Zhang et al. |
| 2012/0239213 | A1 | 9/2012 | Nagata et al. |
| 2015/0228295 | A1 | 8/2015 | Shiimoto et al. |
| 2016/0148627 | A1 | 5/2016 | Nagasaka et al. |
| 2016/0284983 | A1 | 9/2016 | Zhang et al. |

FOREIGN PATENT DOCUMENTS

| JP | 2005025831 A * | 1/2005 | ............. G11B 5/314 |
| JP | 2013-047999 A | 3/2013 | |
| JP | 2013-065385 A | 4/2013 | |

\* cited by examiner

*Primary Examiner* — Craig A. Renner
(74) *Attorney, Agent, or Firm* — Posz Law Group, PLC

(57) ABSTRACT

A magnetic recording head has a main magnetic pole that generates a recording magnetic field applied on a magnetic recording medium from an end surface that is one portion of an air bearing surface facing the magnetic recording medium; a trailing shield provided on the trailing side of the main magnetic pole with a write gap interposed therebetween; and a spin torque oscillator that is provided in the write gap to be interposed between the main magnetic pole and the trailing shield and that generates a magnetic field that exerts an interaction on the recording magnetic field applied on the magnetic recording medium.

16 Claims, 9 Drawing Sheets

MAGNETIC RECORDING HEAD WITH SPIN TORQUE OSCILLATOR LAYERS SATISFYING WIDTH, THICKNESS AND ANGLE RELATIONSHIP FORMULAS

FIELD OF THE INVENTION

The present invention relates to a magnetic recording head, head gimbal assembly and magnetic recording apparatus.

BACKGROUND OF THE INVENTION

In the field of magnetic recording using a head and media medium, further improvement in performance of the magnetic recording medium and the magnetic recording head is required along with the increase in the recording density of the magnetic disk device.

The magnetic recording medium is a discontinuous medium in which magnetic grains are gathered, and each magnetic grain has a single domain structure. In this magnetic recording medium, one recording bit is configured by multiple magnetic grains. Consequently, to increase recording density, the magnetic grains must be made smaller, and the unevenness in the boundary between neighboring recording bits must be reduced. However, when the magnetic grains are made smaller, the problem arises that the thermal stability of the magnetization of the magnetic grains drops accompanying the decline in the volume of the magnetic grains.

As a countermeasure to this problem, enlarging the magnetic anisotropy energy Ku of the magnetic grains has been considered, but this increase in Ku causes an increase in the anisotropic magnetic field (coercive field) of the magnetic recording medium. In contrast to this, the upper limit of the recording magnetic field intensity by the magnetic recording head is virtually determined by the saturation magnetic flux density of the soft magnetic material composing the magnetic core in the head. Consequently, when the anisotropic magnetic field of the magnetic recording medium exceeds the tolerance determined from the upper limit of this recording magnetic field intensity, recording on the magnetic recording medium becomes impossible.

At present, as one method of resolving this kind of thermal stability problem, energy assisted recording has been proposed in which a magnetic recording medium formed with a magnetic material having a large Ku is used and the effective recording magnetic field intensity is lowered by supplementally applying energy to the medium at the time of recording. A recording method that uses a microwave magnetic field as this supplemental energy source is called Microwave Assisted Magnetic Recording (MAMR), and research and development is being promoted for practical use.

In microwave assisted magnetic recording, by applying a microwave magnetic field in the in-plane direction of the medium having a frequency corresponding to an effective magnetic field (Heff) applied to the magnetization of the recording layer of the magnetic recording medium, precession of magnetization in the recording layer is stimulated, and the recording capability of the magnetic recording head is assisted.

As one example of a magnetic recording head using the microwave assisted magnetic recording method, as shown in FIG. 14, a magnetic recording head that includes a main magnetic pole 6', for generating a recording magnetic field to be applied to the magnetic recording medium, a trailing shield 81', and a spin torque oscillator (STO) 10', which has a multi-layer structure of magnetic films and is provided in a write gap between the main magnetic pole 6' and the trailing shield 81', has been proposed (for example, see U.S. Pat. No. 9,001,465 and JP Laid-Open patent application No. 2005-25831). The spin torque oscillator 10' is an element that receives spin transfer torque. The magnetization of the spin torque oscillator 10' fluctuates while precessing under the influence of the spin transfer torque. The magnetic field emitted from the spin torque oscillator 10' interacts with the recording magnetic field, to improve recording performance. For example, the spin torque oscillator 10' can generate a microwave magnetic field in the in-plane direction through the self-oscillation thereof. By superimposing the microwave magnetic field and the recording magnetic field on the magnetic recording medium, precession of the magnetization of the recording layer is induced, and magnetization in the perpendicular direction in the recording layer is reversed.

In such a magnetic recording head, it is considered that the recording properties of the magnetic recording head can be improved by increasing the intensity of the magnetic field (hereafter referred to at times as the "assist magnetic field") emitted from the spin torque oscillator 10'. By increasing the total film thickness of the spin torque oscillator 10', which is configured by a laminated body including a ferromagnetic layer, the intensity of the assist magnetic field can be increased. However, to increase the total film thickness of the spin torque oscillator 10', it is necessary to increase the length in the down-track direction of the write gap between the main magnetic pole 6' and the trailing shield 81'. When this length of the write gap is increased, the main magnetic pole 6' and the trailing shield 81' are separated from each other, and the magnetic field gradient of the recording magnetic field emitted from the main magnetic pole 6' and applied on the magnetic recording medium is greatly reduced. As a result, even if the assist magnetic field, the intensity of which has been increased, interacts with the recording medium, there is a concern that desired recording properties in the magnetic recording head may not be obtained. Consequently, it is required to improve the intensity of the assist magnetic field from the spin torque oscillator 10' provided in the write gap, while reducing the length of the write gap in the down-track direction.

SUMMARY OF THE INVENTION

It is an objective of the present invention to provide a new magnetic recording head, head gimbal assembly and magnetic recording apparatus that can exhibit stable recording properties.

To achieve the above objective, the present invention provides a magnetic recording head includes: a main magnetic pole that generates a recording magnetic field applied on a magnetic recording medium from an end surface that is one portion of an air bearing surface facing the magnetic recording medium; a trailing shield provided on the trailing side of the main magnetic pole with a write gap interposed therebetween; and a spin torque oscillator provided in the write gap interposed between the main magnetic pole and the trailing shield. The spin torque oscillator generates a magnetic field that exerts an interaction on the recording magnetic field applied on the magnetic recording medium. Among the end surfaces of the main magnetic pole, the end surface positioned on the trailing side is configured by an inclined surface, which is inclined toward the trailing side from the air bearing surface toward the back in the height direction. The spin torque oscillator is a laminated body in which at least a magnetic field generation layer, a nonmagnetic spacer layer and a spin injection layer are laminated in this order from the main magnetic pole side. The length of the write gap in the down-track direction, when viewed from the air bearing surface side, is 20 nm or less. The width $W_{FGL}$ (nm) in the cross-track direction of the end surface facing the main magnetic pole, among the end surfaces of the magnetic field generation layer, the film thickness $t_{FGL}$ (nm) of the magnetic field generation layer, the film thickness $t_{SIL}$ (nm) of the spin injection layer and an angle α (deg) formed by the cross-track direction and a normal line to the end surfaces of the laminated body positioned on both sides in the cross-track direction when viewing the laminated body from the air bearing surface side have relationships indicated by the following formula (1-1) and formula (1-2), or relationships indicated by the following formula (2-1) and formula (2-2):

$$\frac{\tan\alpha}{W_{FGL}} \geq -1.72 \times 10^{-2} \times \left(\frac{t_{FGL}}{t_{SIL}}\right)^2 + 2.95 \times 10^{-2} \times \frac{t_{FGL}}{t_{SIL}} + 9.60 \times 10^{-3} \quad (1\text{-}1)$$

$$\frac{\tan\alpha}{W_{FGL}} \leq -3.32 \times 10^{-5} \times \left(\frac{t_{FGL}}{t_{SIL}}\right)^2 - 2.87 \times 10^{-3} \times \frac{t_{FGL}}{t_{SIL}} + 4.69 \times 10^{-2} \quad (1\text{-}2)$$

$$\frac{\tan\alpha}{W_{FGL}} \geq -2.50 \times 10^{-3} \times \left(\frac{t_{FGL}}{t_{SIL}}\right)^2 - 1.98 \times 10^{-3} \times \frac{t_{FGL}}{t_{SIL}} + 4.16 \times 10^{-2} \quad (2\text{-}1)$$

$$\frac{\tan\alpha}{W_{FGL}} \leq -4.50 \times 10^{-4} \times \left(\frac{t_{FGL}}{t_{SIL}}\right)^2 - 3.39 \times 10^{-3} \times \frac{t_{FGL}}{t_{SIL}} + 4.49 \times 10^{-2}. \quad (2\text{-}2)$$

In the above-described magnetic recording head, the saturation magnetization $Ms_{FGL}$ and volume $V_{FGL}$ of the magnetic field generation layer, and the saturation magnetization $Ms_{SIL}$ and the volume $V_{SIL}$ of the spin injection layer, preferably have the relationship indicated by below formula (3).

$$5 \leq \frac{Ms_{FGL}V_{FGL}}{Ms_{SIL}V_{SIL}} \leq 16 \quad (3)$$

In the above-described magnetic recording head, an angle β (deg), which is formed by the end surface facing the air bearing surface, among the end surfaces of the laminated body, and a normal line to the inclined surface of the main magnetic pole, is preferably smaller than an inclined angle γ (deg) of the inclined surface to a direction orthogonal to the air bearing surface. The saturation magnetization $Ms_{SIL}$ of the spin injection layer may be 1 T or greater. The length of the write gap in the down-track direction, when viewed from the air bearing surface side, may be 18 nm or less, and a drive current controller capable of applying a drive current on the spin torque oscillator, toward the spin injection layer from the magnetic field generation layer, may be further provided.

In addition, the present invention provides a head gimbal assembly including the above-described magnetic recording head and a suspension that supports the magnetic recording head.

Furthermore, the present invention provides a magnetic recording apparatus including a magnetic recording medium, the above-described magnetic recording head, and a position-determining apparatus that supports the magnetic recording head and determines position relative to the magnetic recording medium.

With the present invention, it is possible to provide a new magnetic recording head, head gimbal assembly and magnetic recording apparatus that can exhibit stable recording properties.

DETAILED DESCRIPTION OF THE INVENTION

Before explaining the preferred embodiment of the present invention, terms used in this specification are defined. In the laminated structure or element structure formed in the element formation plane of the slider substrate of the magnetic recording head according to the embodiment, the substrate side is referred to as "downward" and the opposite side is referred to as "upward" when viewed from the layer or element that is the standard. In addition, the air bearing surface side is defined as "forward" and the opposite side is defined as "backward" or "rearward" when viewed from the layer or element that is the standard. Furthermore, in the magnetic recording head according to this embodiment, the X-, Y- and Z-axis directions are defined in some drawings as necessary. Here, the Z-axis direction is the above-described "upward and downward direction". The +Z side corresponds to the trailing side and the −Z side corresponds to the leading side. In addition, the Y-axis direction is the track width direction, and the X-axis direction is the height direction.

[Magnetic Recording Apparatus]

Figure 1:
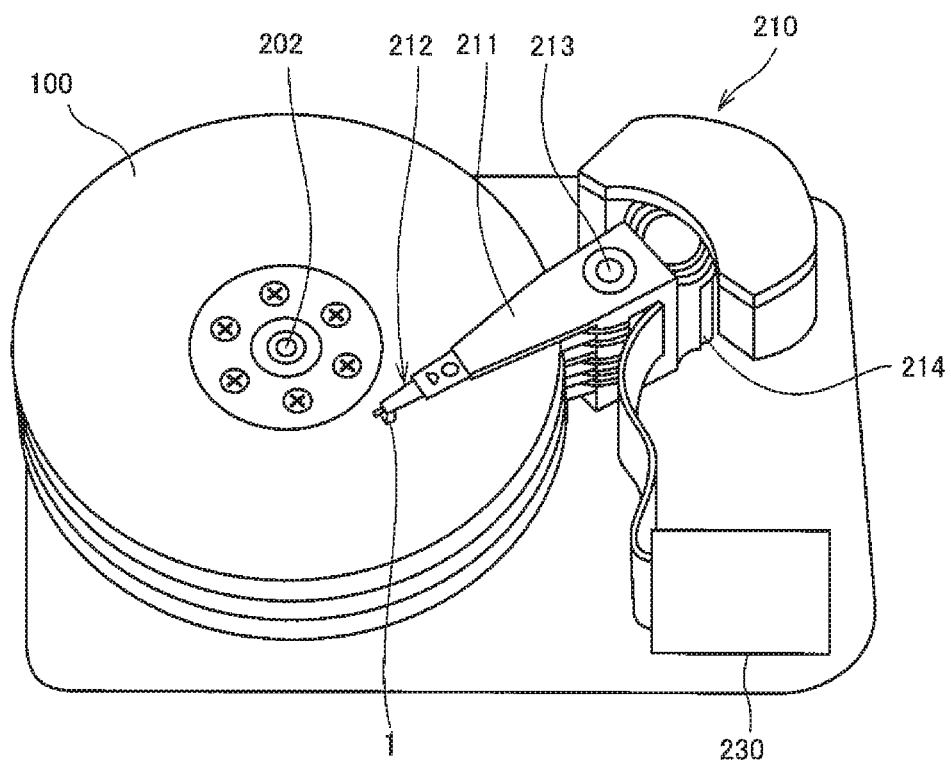
FIG. 1 is a perspective view schematically showing a magnetic recording apparatus according to an embodiment of the present invention.
Figure 2:
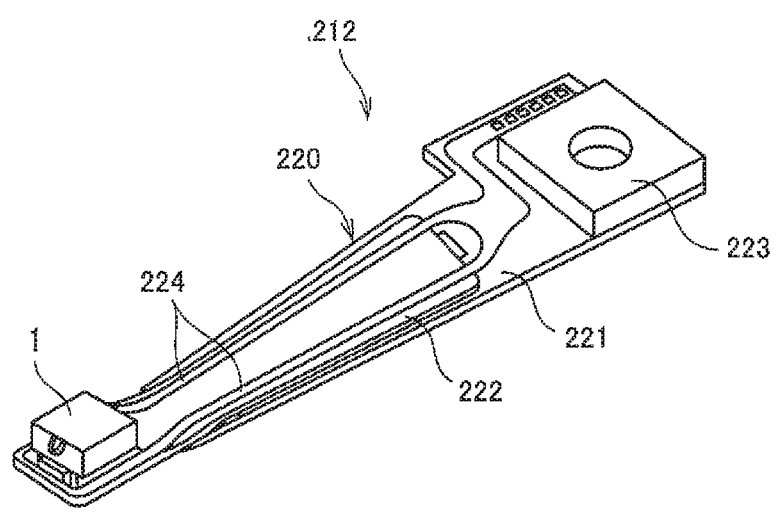
FIG. 2 is a perspective view schematically showing a head gimbal assembly (HGA) according to the embodiment of the present invention.
Figure 3:
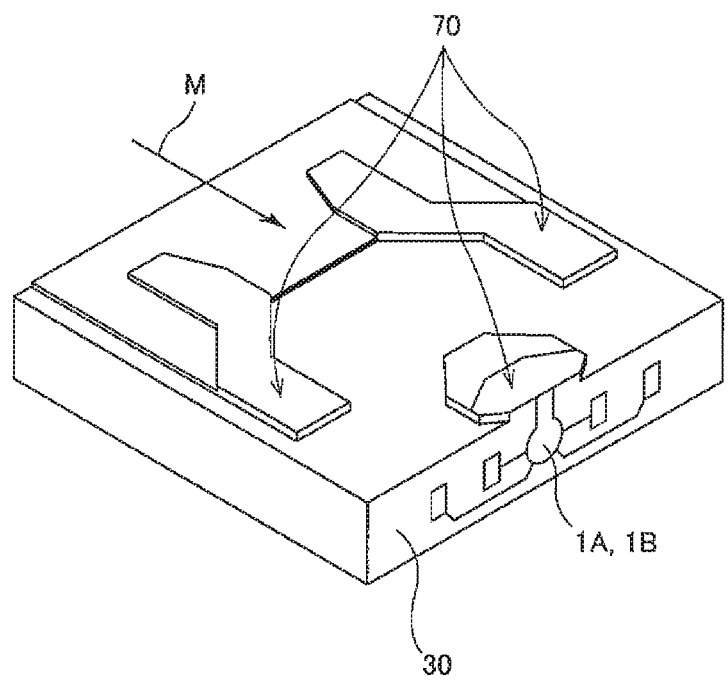
FIG. 3 is a perspective view schematically showing the entire structure of a magnetic recording head according to the embodiment of the present invention.

FIG. 1 is a perspective view schematically showing a magnetic recording apparatus according on which a magnetic recording head according to the embodiment of the present invention is mounted, FIG. 2 is a perspective view schematically showing a head gimbal assembly (HGA) including the magnetic recording head according to the embodiment of the present invention, and FIG. 3 is a perspective view schematically showing the entire configuration of a magnetic recording head according to the embodiment of the present invention.

As shown in FIG. 1, the magnetic recording apparatus according to this embodiment includes a plurality of magnetic disks 100 that rotate about a rotation axis of a spindle motor 202, an assembly gimbal device 210 provided with a plurality of drive arms 211, a head gimbal assembly (HGA) 212 attached to the tip of each drive arm 211 and having a magnetic recording head 1, and a control circuit 230 that controls the writing and reading operations and so forth of the magnetic recording head 1.

In this embodiment, the magnetic disk 100 as a magnetic recording medium is for perpendicular magnetic recording, and, for example, has a structure in which a soft magnetic backing layer, an intermediate layer, a magnetic recording layer (perpendicular magnetization layer) and the like are sequentially laminated on a disk substrate.

The assembly gimbal device 210 is a device for positioning the magnetic recording head 1 on the tracks where the recording bits of the magnetic disk 100 are lined up. In the assembly gimbal device 210, the drive arms 211 are stacked in a direction along a pivot bearing shaft 213 and are configured to be capable of angular oscillation about the pivot bearing shaft 213 by a voice coil motor (VCM) 214.

The structure of the magnetic recording apparatus according to this embodiment is not limited to the above structure, and the magnetic disk 100, the drive arm 211, the HGA 212 and the magnetic recording head 1 may be singular.

In the head gimbal assembly 212 shown in FIG. 2, a suspension 220 has a load beam 221, a flexure 222, which has elasticity and is fixed to the load beam 221, and a base plate 223, which is provided at the base of the load beam 221. In addition, a wiring member 224, which includes a lead conductor and connection pads electrically connected at both ends of the lead conductor, is provided on the flexure 222. A magnetic recording head slider 30 (see FIG. 3), which is provided with the magnetic recording head 1 in this embodiment, is fixed to the flexure 222 at the tip of the suspension 220 to face the surface of each magnetic disk 100 at a predetermined interval (flying height).

Furthermore, one end of the wiring member 224 is electrically connected to a terminal electrode of the magnetic recording head 1 in this embodiment. The structure of the suspension 220 in this embodiment is not limited to the above-described structure.

As shown in FIG. 3, the magnetic recording head slider 30 has an air bearing surface (ABS) 70, which is directly related to flying properties, and is provided with a magnetic recording head 1 at the side surface end (the side surface end on the rearward side of the traveling direction M of the magnetic disk 100) in the traveling direction M (the same direction as the flow of air) side of the magnetic disk 100. The magnetic recording head 1 includes a recording head part 1B and a reproducing head part 1A.

[Magnetic Recording Head]

Figure 4:
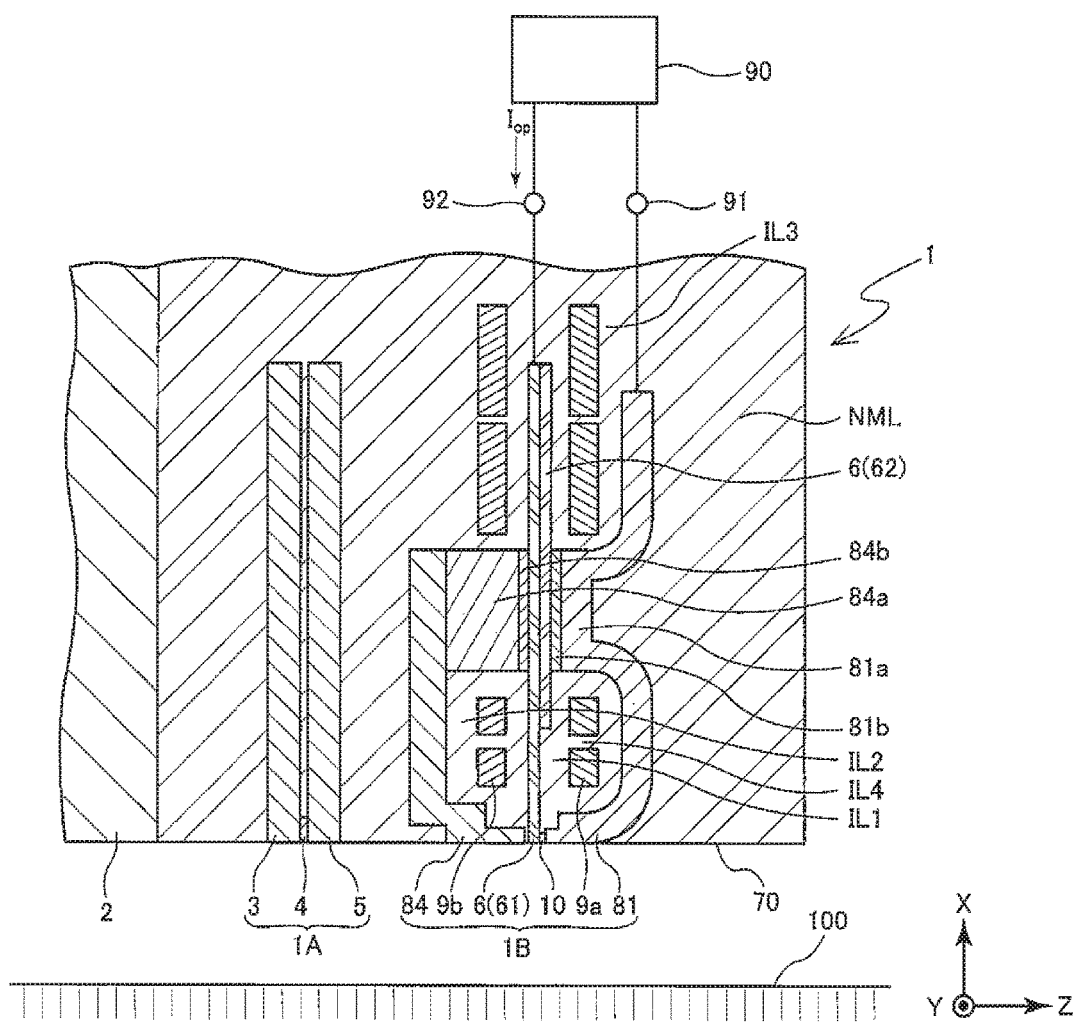
FIG. 4 is a cross-sectional view (along the XZ plane) schematically showing a configuration of main parts of the magnetic recording head according to the embodiment of the present invention.

Next, the magnetic recording head according to the embodiment is described with reference to the drawings. FIG. 4 is a cross-sectional view of the magnetic recording head according to the embodiment (XZ cross-sectional view) along the direction intersecting the ABS, which is the air bearing surface.

As shown in FIG. 4, the magnetic recording head 1 according to the embodiment has a slider substrate 2, and a reproducing head part 1A and a recording head part 1B, which are laminated and formed on the element formation surface of the slider substrate 2. In addition, the magnetic recording head 1 has the ABS 70, which is the air bearing surface facing the magnetic disk 100.

The reproducing head part 1A includes an MR element 4, which is arranged in the vicinity of the ABS 70 and is for detecting a signal magnetic field from the magnetic disk 100, and a lower shield layer 3 and an upper shield layer 5, which are made of magnetic materials formed on the element formation surface of the slider substrate 2.

The lower shield layer 3 and the upper shield layer 5 are provided mainly to prevent the MR element 4 from receiving external magnetic fields that are noise. The lower shield layer 3 and the upper shield layer 5 are magnetic layers made of magnetic materials formed by, for example, a frame plating method, a sputtering method or the like. The lower shield layer 3 and the upper shield layer 5 are respectively composed by soft magnetic materials, for example, NiFe (permalloy), FeSiAl (sendust), CoFeNi, CoFe, FeN, FeZrN or CoZrTaCr or the like, or multi-layer films of these materials. The thicknesses of the lower shield layer 3 and the upper shield layer 5 are, for example, approximately 0.1~3 μm, respectively.

The MR element 4 is a magnetic sensor that senses signal magnetic fields using an MR effect. For example, the MR element may be any of a Current In Plane-Giant Magneto-Resistive (CIP-GMR) stack using a current in-plane giant magneto-resistive effect, a Current Perpendicular to Plane-Giant Magneto-Resistive (CPP-GMR) stack using a perpendicular current giant magneto-resistive effect, or a Tunneling Magneto-Resistive (TMR) stack using a tunnel magneto-resistive effect.

The MR element 4 utilizing these MR effects can sense signal magnetic fields from the magnetic disk 100 with high sensitivity. When the MR element 4 is a CPP-GMR stack or a TMR stack, the lower shield layer 3 and the upper shield layer 5 can also serve as electrodes. On the other hand, when the MR element 4 is a CIP-GMR stack, an insulating layer is respectively provided between the MR element 4 and the lower shield layer 3 and between the MR element 4 and the upper shield layer 5, and furthermore, an MR lead layer electrically connected to the MR element 4 is provided.

The recording head part 1B is for perpendicular magnetic recording and has a main magnetic pole layer 6, a trailing shield 81, a leading shield 84, a spin torque oscillator 10, which is positioned in the gap (write gap) between the main magnetic pole layer 6 and the trailing shield 81, a first coil 9a, and a second coil 9b.

The main magnetic pole layer 6 configures a magnetic path to focus magnetic flux generated by applying a writing electric current to the first coil 9a and the second coil 9b and guide the magnetic flux to the magnetic recording layer (perpendicular magnetization layer) of the magnetic disk to be written.

The main magnetic pole layer 6 extends from the ABS 70 toward the rear in the height direction and includes a main magnetic pole part 61 and an auxiliary magnetic pole part 62. The main magnetic pole part 61 and the auxiliary magnetic pole part 62 can be positioned upside down (Z direction) depending on design specifications.

Figure 5:
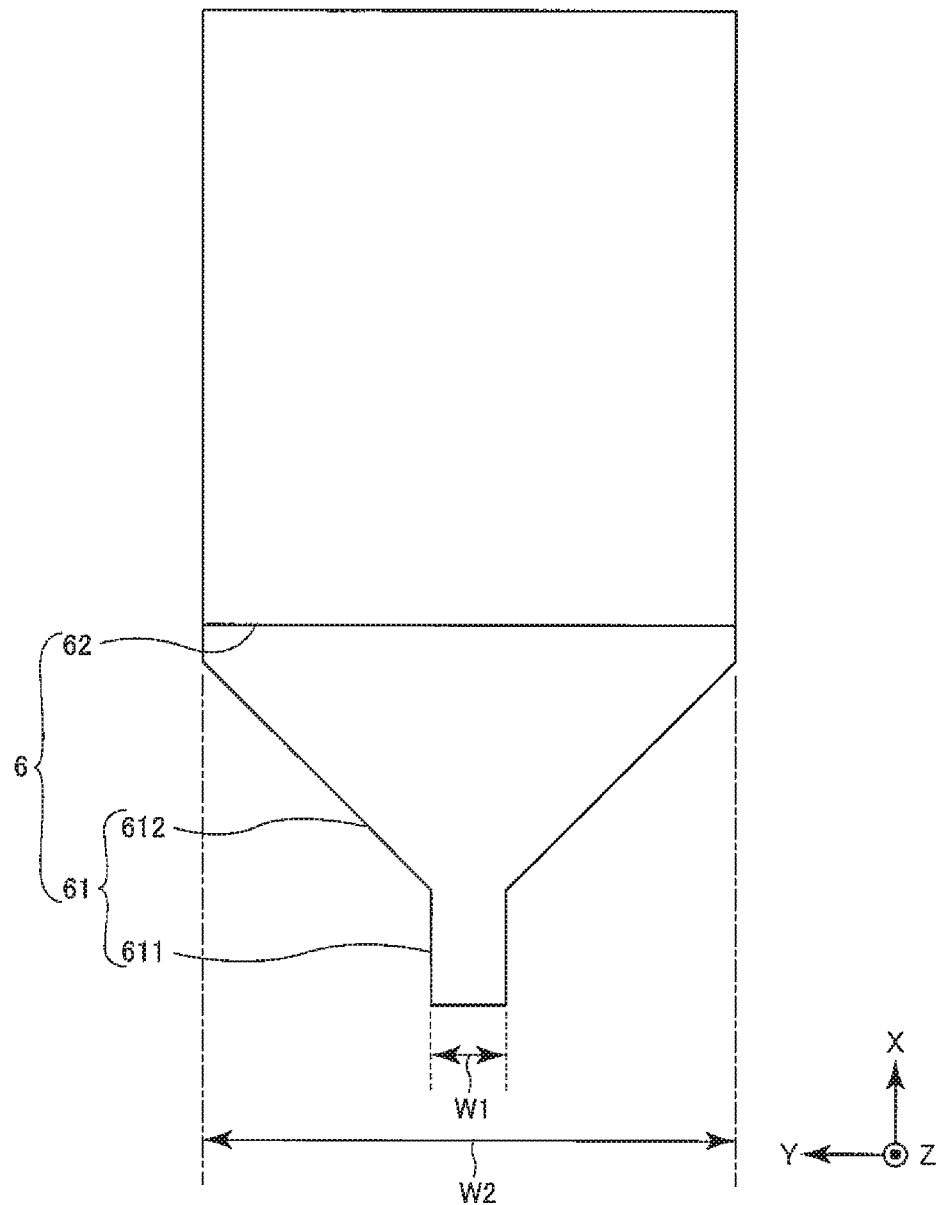
FIG. 5 is a plan view schematically showing a main magnetic pole layer in the recording head of the magnetic recording head according to the embodiment of the present invention.

The auxiliary magnetic pole part 62 extends in the height direction from a position retracted from the ABS 70. This auxiliary magnetic pole part 62 is positioned, for example, on the trailing side with respect to the main magnetic pole part 61 and has a rectangular planar shape (width W2), as shown in FIG. 5. The auxiliary magnetic pole part 62, as noted above, may also be positioned on the leading side of the main magnetic pole part 61.

The main magnetic pole part 61 extends from the ABS 70 toward the rear in the height direction. This main magnetic pole part 61, for example, includes a narrow first magnetic pole part 611, which extends from the ABS 70 toward the rear in the height direction, and a wide second magnetic pole part 612, which is continuous to the rear of the first magnetic pole part 611, as shown in FIG. 5.

The first magnetic pole part 611 is an effective magnetic flux discharge portion and has a fixed width W1 stipulating the recording track width. The second magnetic pole part 612 is a portion supplying magnetic flux to the first magnetic pole part 611 and has a width W2 larger than the width W1 of the first magnetic pole part 611. The width W2 of the second magnetic pole part 612 gradually narrows toward the front in the height direction approaching the first magnetic pole part 611. Since the first magnetic pole part 611 has a small width W1, it is possible to generate a fine writing magnetic field, and it is possible to set the track width to a minute value corresponding to high recording density.

Figure 7:
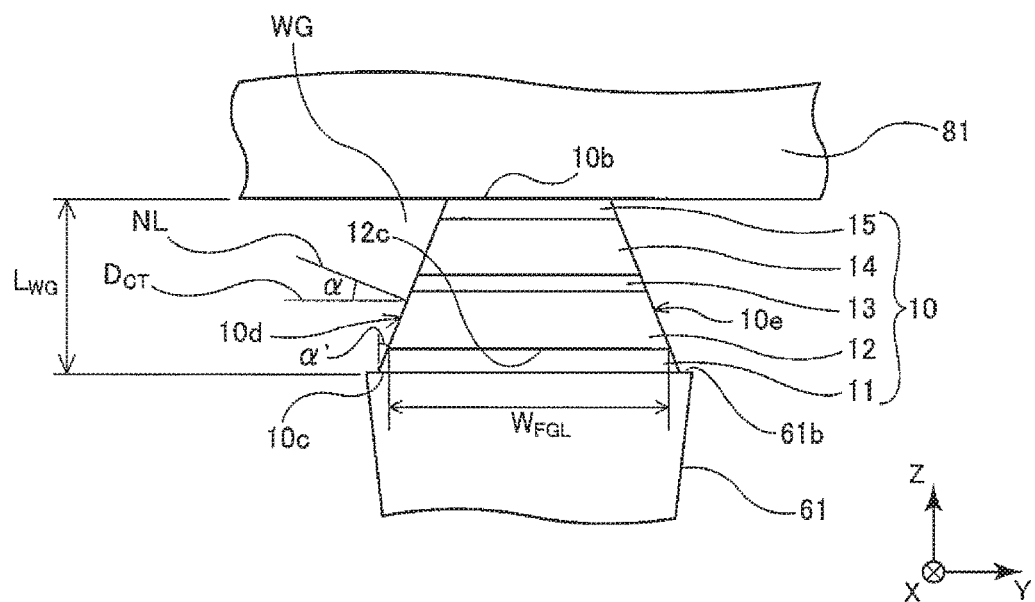
FIG. 7 is a plan view viewed from the ABS side, showing a schematic configuration of the recording head of the magnetic recording head according to the embodiment of the present invention.
Figure 13:
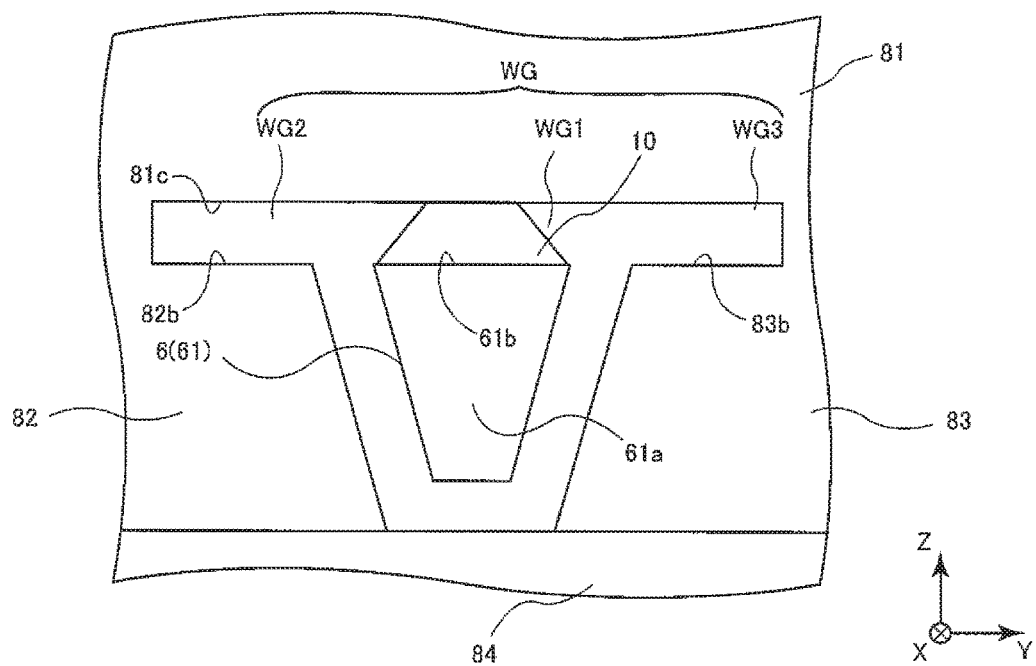
FIG. 13 is a plan view viewed from the ABS side, showing a schematic configuration of another state of the recording head of the magnetic recording head according to the embodiment of the present invention.
Figure 14:
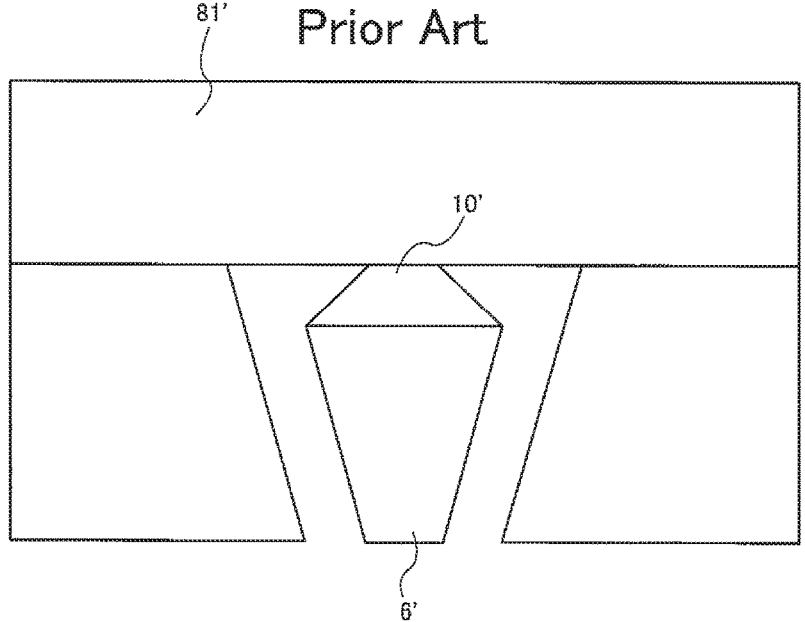
FIG. 14 is a plan view viewed from the ABS side, showing a schematic configuration of the recording head of a conventional magnetic recording head.

The main magnetic pole part 61 has a so-called inverted trapezoidal shape end surface 61a in which, at the ABS 70, the top side (+Z side) is wider than the lower side (−Z side), and the width thereof narrows when moving in the downward direction (−Z direction), for example (see FIG. 7, FIG. 13).

The main magnetic pole layer 6 (main magnetic pole part 61 and auxiliary magnetic pole part 62) is composed by a soft magnetic material having a high saturation flux density and, for example, can be composed of a soft magnetic material that is a ferrous alloy material (FeNi, FeCo, FeCoNi, FeN, FeZrN, or the like) leaving Fe as a major component. The main magnetic pole part 61 and the auxiliary magnetic pole part 62 may also be independent and each composed of a different soft magnetic material. For example, the main magnetic pole part 61 may be composed of a soft magnetic material having a higher saturation flux density than the auxiliary magnetic pole part 62.

Figure 6:
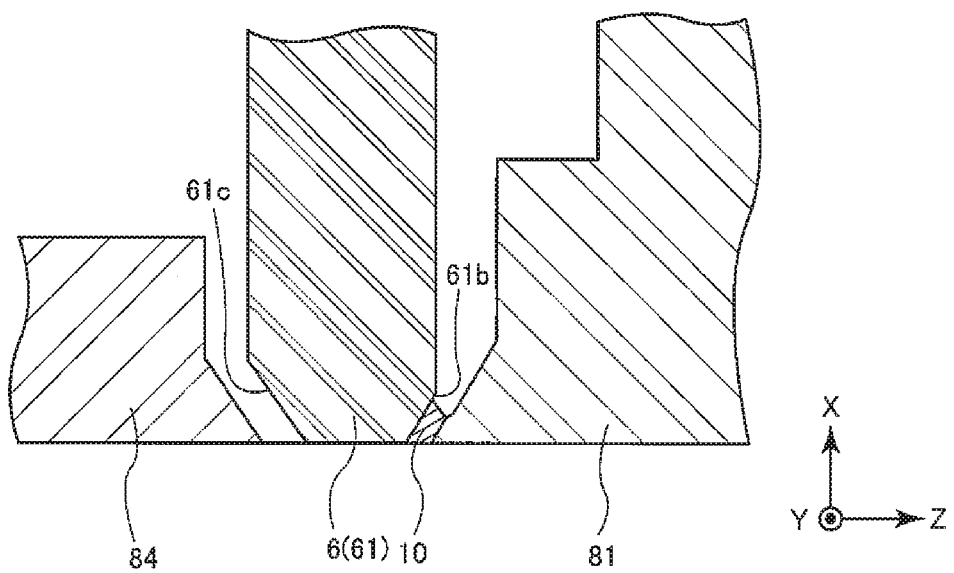
FIG. 6 is a partial enlarged cross-sectional view showing a schematic configuration of the recording head of the magnetic recording head according to the embodiment of the present invention.

As shown in FIG. 6, the trailing side (+Z side) end surface 61b and the leading side (−Z side) end surface 61c of the main magnetic pole part 61 positioned near the ABS 70 are configured to have a tapered shape so that the thickness (thickness in the Z direction) of the main magnetic pole part 61 gradually decreases toward the ABS 70. Through this, the recording flux emitted from the main magnetic pole part 61 (first magnetic pole part 611) can he more focused at the ABS 70.

Figure 8:
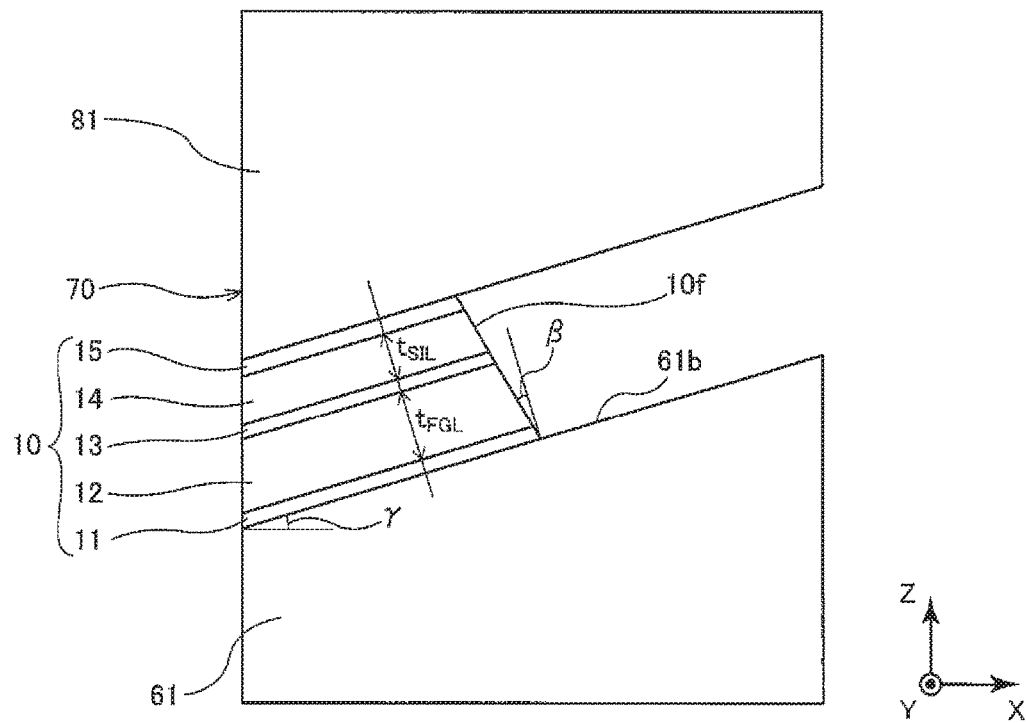
FIG. 8 is a partially enlarged cross-sectional view showing a schematic configuration of the main magnetic pole, the spin torque oscillator and the trailing shield of the magnetic recording head in the embodiment of the present invention.

The end surface 61b of the main magnetic pole part 61 positioned near the ABS 70 is inclined toward the trailing side (+Z side) in the height direction from the ABS 70 (see FIG. 8). Since the end surface 61b is inclined, the magnetic flux for recording emitted from the main magnetic pole part 61 (first magnetic pole part 611) can be more focused at the ABS 70. Furthermore, the spin torque oscillator 10 provided on the end surface 61b can be inclined with respect to the ABS 70, so it becomes easy to adjust the volume of the spin injection layer 14 and the magnetic field generation layer 12 so that good oscillation properties are obtained from the spin torque oscillator 10. The inclined angle γ (the angle formed by the inclined surface 61b and the direction orthogonal to the ABS 70 (the height direction)) of this end surface (inclined surface) 61b is, for example, 10~40° and preferably 20~30°. When this inclined angle γ is less than 10°, there is a concern that the intensity of the recording magnetic field decreases because the volume of the main magnetic pole part 61 near the ABS 70 decreases, and there is a concern that good spin torque oscillation will not be obtained because it is not possible to adjust the volumes of the magnetic field generation layer 12 and the spin injection layer 14 with only end surface angle β backward in the height direction when viewed from the ABS 70. In addition, when the inclined angle γ exceeds 40°, the magnetic flux volume that leaks from the end surface 61b of the main magnetic pole part 61 increases, raising the concern that the magnetic flux volume focused on the ABS 70 will decreases and the intensity of the recording magnetic field may decrease.

As shown in FIG. 13, the main magnetic pole part 61 when viewed front the ABS 70 side is surrounded by the trailing shield 81 positioned at the trailing side (+Z side) of the main magnetic pole part 61, the side shields 82 and 83 positioned at both outer sides in the cross-track direction of the main magnetic pole part 61 and continuous to the trailing shield 81, and the leading shield 84 positioned at the leading side (−Z side) of the main magnetic pole part 61 and continuous to the side shields 82 and 83. The trailing shield 81 is positioned on the trailing side (+Z side) of the main magnetic pole part 61 so that the write gap WG is interposed between the trailing shield 81 and the main magnetic pole part 61. The trailing shield 81, the side shields 82 and 83 and the leading shield 84 have the function of taking in the recording flux emitted and spreading from the main magnetic pole part 61. The trailing shield 81 reaches the ABS 70 and serves the role of a magnetic path for the magnetic flux that has returned from the soft magnetic backing layer provided under the recording layer (vertical magnetization layer) of the magnetic disk 100. The trailing shield 81, the side shields 82 and 83 and the leading shield 84 can be composed by, for example, NiFe (permalloy) or a ferrous alloy material or the like similar to the main magnetic pole layer 6 having a high saturation flux density.

As shown in FIG. 7, the spin torque oscillator 10 that generates a magnetic field (for example, a microwave magnetic field) that exerts an interaction on the recording magnetic field from the main magnetic pole layer 6 (main magnetic pole part 61) during writing is provided in the write gap WG positioned between the main magnetic pole part 61 and the trailing shield 81. The shape of the spin torque oscillator 10 when viewed from the ABS 70 side is a roughly trapezoidal shape with the width in the cross-track direction of the leading side (−Z side) end surface 10c large and the width in the cross-track direction of the trailing-side (+Z side) end surface 10b small (see FIG. 7).

The length $L_{WG}$ of the write gap WG in the down-track direction is 20 nm or less, and preferably 18 nm or less. When the length $L_{WG}$ of the write gap WG exceeds 20 nm, the magnetic field gradient of the recording magnetic field emitted from the main magnetic pole layer 6 (main magnetic pole part 61) and impressed on the magnetic disk 100 decreases, and the desired recording properties cannot be obtained.

Details of the layer configuration of the spin torque oscillator 10 will be described with reference to FIG. 9 and FIG. 10.

Figure 9:
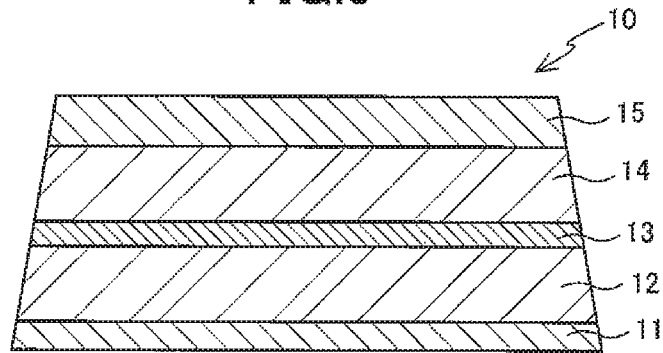
FIG. 9 is a cross-sectional view schematically showing a first state of a laminated structure of the spin torque oscillator in the embodiment of the present invention.
Figure 10:
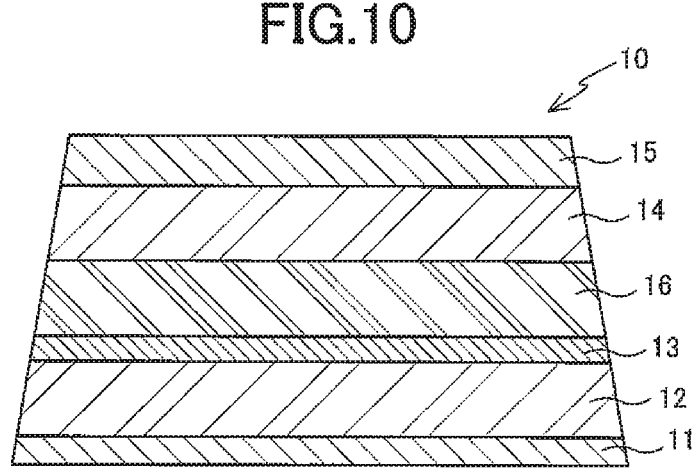
FIG. 10 is a cross-sectional view schematically showing a second state of a laminated structure of the spin torque oscillator in the embodiment of the present invention.
Figure 11:
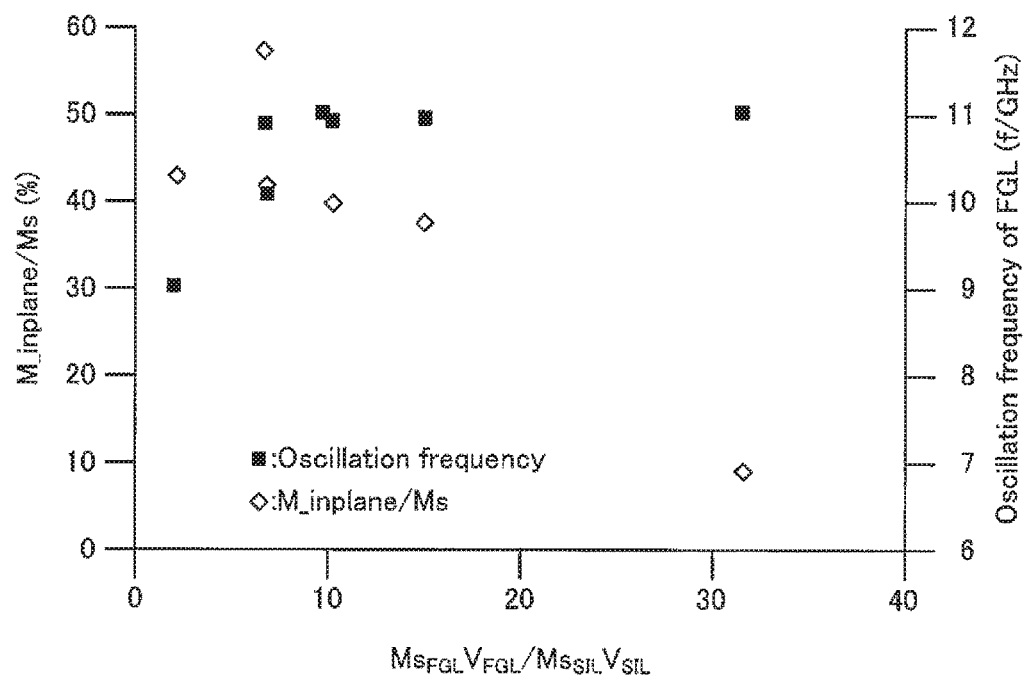
FIG. 11 is a graph showing the relationship among the ratio of the product $Ms_{FGL}V_{FGL}$ of the saturation magnetization $Ms_{FGL}$ and the volume $V_{FGL}$ of the magnetic field generation layer to the product $Ms_{SIL}V_{SIL}$ of the saturation magnetization $Ms_{SIL}$ and the volume $V_{SIL}$ of the spin injection layer of the spin torque oscillator in the embodiment of the present invention, and the oscillator frequency of the magnetic field generation layer and the ratio of the in-plane component of the magnetization to the saturation magnetization of the magnetic field generation layer.

As shown in FIG. 9, the spin torque oscillator 10 is a laminated element in which a buffer layer 11, a magnetic field generation layer 12, a nonmagnetic spacer layer 13, a spin injection layer 14 and a cap layer 15 are layered from the mail magnetic pole (main magnetic pole part 61) side in this order. The spin torque oscillator 10 passes a direct current from the magnetic field generation layer 12 (buffer layer 11) side toward the spin injection layer 14 (cap layer 15) side, and through this the desired magnetic field (for example, a microwave magnetic field) can be generated from the spin torque oscillator 10.

The buffer layer 11 is configured by a simple layer or a plurality of layers, and composed of one metal selected from the group consisting of tantalum (Ta), aluminum (Al), titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), ruthenium (Ru), rhodium (Rh), palladium (Pd), silver (Ag), hafnium (Hf), tungsten (W), iridium (Ir), platinum (Pt) and gold (Au), or an alloy layer including at least one selected from the above group. The thickness of the buffer layer 11 is at least 1 nm, and preferably around 1.5~5 nm. When the thickness of the buffer layer 11 is less than 1 nm, the magnetic coupling of the magnetic field generation layer 12 and the main magnetic pole part 61 becomes too strong, creating concerns that it could be difficult to stimulate precession of the magnetization of the magnetic field generation layer 12.

Each of the magnetic field generation layer 12 and the spin injection layer 14 is a strong magnetic layer composed of a strongly magnetic material. The intensity of the magnetic field generated upon receiving the spin transfer torque (for example, the microwave magnetic field) increases as the saturation magnetization Ms of the magnetic field generation layer 12 increases and the film thickness thereof increases, so the magnetic field generation layer 12 is preferably composed of a material with a large saturation magnetization Ms, and the film thickness thereof preferably becomes thicker in a prescribed range that fits in the write gap WG (see FIG. 7). As the constituent material of the magnetic field generation layer 12 and the spin injection layer 14, soft magnetic materials such as [FeCo/Ni]$_n$, FeCo, FeCoAl, FeCoSi, FeCoB, FeNi or the like, or CoIr, [Fe/Co]$_n$ or the like having a negative vertical magnetic anisotropy, or a multi-layer film of magnetic bodies such as [CoFe/Ni]$_n$, [Co/Pt]$_n$, or the like or a multilayer film of magnetic bodies and nonmagnetic bodies, or an alloy having vertical magnetic anisotropy such as CoPt, FePt, MnGa or the like, can be cited. Here, "n" is a repeated layer number of the layered structure indicated in the brackets (for example, n is around 1~20). The film thickness of the magnetic field generation layer 12 is around 1~50 nm, and preferably around 1~20 nm.

The film thickness of the spin injection layer 14 is around 0.5~5 nm, and preferably around 1~3 nm.

To increase the spin polarization ratio of one of the magnetic field generation layer 12 and the spin injection layer 14, a magnetic body layer with high spin polarization ratio may exist between the nonmagnetic spacer layer 13 and the magnetic field generation layer 12 or the spin injection layer 14. In particular, when the magnetic field generation layer 12 or the spin injection layer 14 (for example, the spin injection layer 14) is composed of [CoFe/Ni]$_n$, because Ni has a small spin polarization ratio, is included, the magnetic body layer 16 may be interposed between the nonmagnetic spacer layer 13 and the spin injection layer 14, for example, as shown in FIG. 10. When the perpendicular magnetic anisotropy of the magnetic body layer 16 is smaller than the perpendicular magnetic anisotropy of the spin injection layer 14, the magnetization of the magnetic body layer 16 easily reverses, so through that the magnetization reversal of the spin injection layer 14 is promoted. As materials composing this magnetic body layer 16, it is possible to use soft magnetic alloys such as CoFe, CoFeB or the like, Co-based Heusler alloys such as Co$_2$MnSi, Co$_2$FeSi or the like, and materials having a negative spin polarity such as FeCr, FeV or the like. The film thickness of the above-described magnetic body layer 16 is preferably 0.1~8 nm, and more preferably 0.4~4 nm.

The nonmagnetic spacer layer 13 may be composed of nonmagnetic metals high spin transmittance such as copper (Cu), silver (Ag), gold (Au), chrome (Cr), aluminum (Al), ruthenium (Ru), iridium (Ir) or the like or alloys including such, or may be a tunnel barrier layer such as an MgO$_x$ layer, AlO$_x$ layer, MgAlO$_x$ layer, TiO layer, SiN layer or the like, or a semiconductor spacer layer such as a ZnOx layer, InOx layer, SnOx layer, SbOx layer, ITO layer, GaOx layer, AlN$_x$ layer, TiN$_x$ layer, GaN$_x$ layer or the like. The film thickness of the nonmagnetic spacer layer 13 is set to 0.4 nm or more, for example, and is preferably around 1.5~3 nm. Since the film thickness of the nonmagnetic spacer layer 13 is within the above-described range, it is possible to optimally adjust the exchange coupling state between the magnetic field generation layer 12 and the spin injection layer 14.

The cap layer 15 is comprised of Ru or the like, for example, and the thickness is set to 1 nm or more, and preferably to around 1.5~5 nm. When the thickness of the cap layer 15 is less than 1 nm, the magnetic coupling of the spin injection layer 14 and the magnetic field generation layer 12, and the trailing shield 81, becomes too strong, creating the fear that it could become difficult to stimulate precession of the magnetic field generation layer 12 and magnetization reversal of the spin injection layer 14.

In this embodiment, the width $W_{FGL}$ (nm) in the cross-track direction of the end surface 12c facing the main magnetic pole part 61 of the magnetic field generation layer 12, the film thickness $t_{FGL}$ (nm) of the magnetic field generation layer 12, the film thickness $t_{SIL}$ (nm) of the spin injection layer 14, and the angle α (deg) formed by the normal line NL of the end surfaces 10d and 10e positioned on both sides of the spin torque oscillator 10 in the cross-track direction and the cross-track direction $D_{CT}$ have the relationships indicated by the following formula (1-1) and formula (1-2):

$$\frac{\tan \alpha}{W_{FGL}} \geq -1.72 \times 10^{-2} \times \left(\frac{t_{FGL}}{t_{SIL}}\right)^2 + 2.95 \times 10^{-2} \times \frac{t_{FGL}}{t_{SIL}} + 9.60 \times 10^{-3} \quad (1\text{-}1)$$

$$\frac{\tan \alpha}{W_{FGL}} \leq -3.32 \times 10^{-5} \times \left(\frac{t_{FGL}}{t_{SIL}}\right)^2 - 2.87 \times 10^{-3} \times \frac{t_{FGL}}{t_{SIL}} + 4.69 \times 10^{-2}. \quad (1\text{-}2)$$

In this embodiment, the width $W_{FGL}$ of the end surface 12c of the magnetic field generation layer 12 in the cross-track direction may be found as the width in the cross-track direction at the central position between the ABS 70 and the end of the end surface 12c backward in the height direction, and may be found as the average value of the width in the cross-track direction of the end surface 12c at the ABS 70 and the width in the cross-track direction of the end surface 12c at the end backward in the height direction. The film thickness $t_{FGL}$ of the magnetic field generation layer 12 and the film thickness $t_{SIL}$ of the spin injection layer 14 are found as the film thickness of each layer in the normal direction to the end surface 61b of the main magnetic pole part 61. When the end surfaces 10d and 10e are curved surfaces, the angle α formed by the cross-track direction and the normal line NL of the end surfaces 10d and 10e of the spin torque oscillator 10 is found as the angle formed by the cross-track direction and the normal line at an approximate plane (a plane found for example using the least squares method) of the laminated portion of the magnetic field generation layer 12, the nonmagnetic spacer layer 13 and the spin injection layer 14, out of the end surfaces 10d and 10e. The angle α may be calculated from the following formula after finding the angle α' formed by the normal line to a line segment comprising the end surface 61b of the main magnetic pole part 61 in the ABS 70 and the line segment comprising the end surfaces 10d and 10e of the spin torque oscillator 10, and the inclined angle γ of the end surface (inclined surface) 61b of the main magnetic pole part 61.

$$\tan\alpha = \tan\alpha' \times \cos\gamma$$

Since the spin torque oscillator 10 satisfies the conditions indicated by the above formulas (1-1) and (1-2), it is possible to cause the spin torque oscillator 10 to oscillate well and to generate a magnetic field (microwave magnetic field) of sufficient intensity.

In the spin torque oscillator 10 satisfying the conditions indicated by the above formulas (1-1) and (1-2), the saturation magnetization $Ms_{FGL}$ and volume $V_{FGL}$ of the magnetic field generation layer 12, and the saturation magnetization $Ms_{SIL}$ and volume $V_{SIL}$ of the spin injection layer 14 preferably have the relationship indicated in formula (3) below.

$$5 \leq \frac{Ms_{FGL}V_{FGL}}{Ms_{SIL}V_{SIL}} \leq 16 \quad (3)$$

When the product $Ms_{SIL}V_{SIL}$ of the saturation magnetization $Ms_{SIL}$ and volume $V_{SIL}$ of the spin injection layer 14 becomes relatively large compared to the product $Ms_{FGL}V_{FGL}$ of the saturation magnetization $Ms_{FGL}$ and volume $V_{FGL}$ of the magnetic field generation layer 12, the oscillation frequency of the magnetic field generation layer 12 decreases. On the other hand, when the product $Ms_{SIL}V_{SIL}$ becomes relatively small compared to the product $Ms_{FGL}V_{FGL}$, the ratio of the in-plane component of the magnetization to the saturation magnetization of the magnetic field generation layer 12 (M_inplane/Ms) decreases, and the intensity of the magnetic field (microwave magnetic field) generated from the spin torque oscillator 10 decreases. Consequently, in order to simultaneously achieve oscillations at high frequencies (for example, 10 GHz or higher) in the spin torque oscillator 10 and generation of a sufficiently strong magnetic field (microwave magnetic field), the ratio ($Ms_{FGL}V_{FGL}/Ms_{SIL}V_{SIL}$) of the product $Ms_{FGL}V_{FGL}$ of the saturation magnetization $Ms_{FGL}$ and volume $V_{FGL}$ of the magnetic field generation layer 12 to the product $Ms_{SIL}V_{SIL}$ of the saturation magnetization $Ms_{SIL}$ and volume $V_{SIL}$ of the spin injection layer 14 is preferably 5 or more and 16 or less.

Accordingly, Since the spin torque oscillator 10 satisfies the condition indicated by the above formula (3), it is possible to cause the spin torque oscillator 10 to oscillate well and generate a magnetic field (microwave magnetic field) of sufficient intensity.

In this embodiment, the width $W_{FGL}$ (nm) in the cross-track direction of the end surface 12c facing the main magnetic pole part 61 of the magnetic field generation layer 12, the film thickness $t_{FGL}$, (nm) of the magnetic field generation layer 12, the film thickness $t_{SIL}$ (nm) of the spin injection layer 14, and the angle α (deg) formed by the normal line NL to the end surfaces 10d and 10e positioned on both sides of the spin torque oscillator 10 in the cross-track direction and the cross-track direction may have the relationships indicated by the following formula (2-1) and formula (2-2):

$$\frac{\tan\alpha}{W_{FGL}} \geq -2.50\times 10^{-3} \times \left(\frac{t_{FGL}}{t_{SIL}}\right)^2 - 1.98\times 10^{-3} \times \frac{t_{FGL}}{t_{SIL}} + 4.16\times 10^{-2} \quad (2\text{-}1)$$

$$\frac{\tan\alpha}{W_{FGL}} \leq -4.50\times 10^{-4} \times \left(\frac{t_{FGL}}{t_{SIL}}\right)^2 - 3.39\times 10^{-3} \times \frac{t_{FGL}}{t_{SIL}} + 4.49\times 10^{-2}. \quad (2\text{-}2)$$

When the spin torque oscillator 10 satisfies the conditions indicated by the above formulas (2-1) and (2-2), the saturation magnetization $Ms_{FGL}$ and volume $V_{FGL}$ of the magnetic field generation layer 12 and the saturation magnetization $Ms_{SIL}$ and the volume $V_{SIL}$ of the spin injection layer 14 have the relationship indicated by formula (3) above. Hence, since the spin torque oscillator 10 satisfies the conditions indicated by the above formulas (2-1) and (2-2), it is possible to cause the spin torque oscillator 10 to oscillate well and generate a magnetic field (microwave magnetic field) of sufficient intensity.

The saturation magnetization $Ms_{FGL}$ of the magnetic field generation layer 12 is preferably 1.8 T or more, and more preferably around 2~2.4 T. The intensity of the magnetic field (for example, microwave magnetic field) emitted from the spin torque oscillator 10 is proportional to the saturation magnetization $Ms_{FGL}$ of the magnetic field generation layer 12, so by having the saturation magnetization $Ms_{FGL}$ be at least 1.8 T, it is possible to generate a magnetic field (microwave magnetic field) of sufficient intensity from the spin torque oscillator 10.

In addition, the saturation magnetization $Ms_{SIL}$ of the spin injection layer 14 is preferably 1 T or more, and more preferably around 1~1.8 T. Since the saturation magnetization $Ms_{SIL}$ of the spin injection layer 14 is 1 T or more, it is possible to generate a magnetic field (microwave magnetic field) of sufficient intensity from the spin torque oscillator 10.

The angle β (deg) formed by the end surface (the end surface positioned backward in the height direction) 10f of the spin torque oscillator 10 facing the ABS 70 and the normal line to the end surface (inclined surface) 61b of the main magnetic pole part 61 is preferably smaller than the inclined angle γ of the end surface (inclined surface) 61b of the main magnetic pole part 61 (see FIG. 8). This angle β may specifically be 0~30 deg, and is preferably 0~15 deg. Since the angle β is smaller than the inclined angle γ, the in-plane component of the magnetization of the magnetic field generation layer 12 at the time of oscillation of the spin torque oscillator 10 becomes large, and it is possible to generate a magnetic field (microwave magnetic field) of sufficient intensity.

As described above, since the saturation magnetization $Ms_{FGL}$ and volume $V_{FGL}$ of the magnetic field generation layer 12 and the saturation magnetization $Ms_{SIL}$ and the volume $V_{SIL}$ of the spin injection layer 14 have the relationship indicated by the above-described formula (3), it is possible to improve the oscillation frequency and the microwave magnetic field intensity from the spin torque oscillator 10.

When the saturation magnetization $Ms_{FGL}$ and volume $V_{FGL}$ of the magnetic field generation layer 12 and the saturation magnetization $Ms_{SIL}$ and the volume $V_{SIL}$ of the spin injection layer 14 have the relationship indicated by the above-described formula (3), the width $W_{FGL}$ (nm) and the angle $\alpha$ (deg) of the spin torque oscillator 10 can be expressed by the two formulas below.

$$\frac{\tan\alpha}{W_{FGL}} > \frac{h(X_1-1)+(\tan\beta+\tan\gamma)\left\{\frac{1}{2}t_{FGL}-(t_{FGL}+t_{spacer})X_1-\frac{1}{2}t_{SIL}X_1\right\}}{-ht_{FGL}+2h(t_{FGL}+t_{spacer})X_1+ht_{SIL}X_1+} $$
$$(\tan\beta+\tan\gamma)\left\{\frac{2}{3}t_{FGL}^2-2(t_{FGL}+t_{spacer})^2X_1- \right.$$
$$\left. 2(t_{FGL}+t_{spacer})t_{SIL}X_1-\frac{2}{3}t_{SIL}^2X_1\right\}$$

$$\frac{\tan\alpha}{W_{FGL}} > \frac{h(X_2-1)+(\tan\beta+\tan\gamma)\left\{\frac{1}{2}t_{FGL}-(t_{FGL}+t_{spacer})X_2-\frac{1}{2}t_{SIL}X_2\right\}}{-ht_{FGL}+2h(t_{FGL}+t_{spacer})X_2+ht_{SIL}X_2+}$$
$$(\tan\beta+\tan\gamma)\left\{\frac{2}{3}t_{FGL}^2-2(t_{FGL}+t_{spacer})^2X_2- \right.$$
$$\left. 2(t_{FGL}+t_{spacer})t_{SIL}X_2-\frac{2}{3}t_{SIL}^2X_2\right\}$$

In the above formula, h indicates "the length in the height direction of the end surface 12c of the magnetic field generation layer 12", $t_{FGL}$ indicates "the film thickness of the magnetic field generation layer 12 (the film thickness of the magnetic field generation layer 12 in the direction of the normal line to the end surface 61b of the main magnetic pole part 61)", $t_{Spacer}$ indicates "the film thickness of the nonmagnetic spacer layer 13 (the film thickness of the nonmagnetic spacer layer 13 in the direction of the normal line to the end surface 61b of the main magnetic pole part 61)", $t_{SIL}$ indicates "the film thickness of the spin injection layer 14 (the film thickness of the spin injection layer 14 in the direction of the normal line to the end surface 61b of the main magnetic pole part 61)", β indicates "the angle formed by the end surface (end surface positioned backward in the height direction) 10f of the spin torque oscillator 10 facing the ABS 70 and the normal line to the end surface (inclined surface) 61b of the main magnetic pole part 61", γ indicates "the inclined angle of the end surface (inclined surface) 61b of the main magnetic pole part 61 (the angle formed by the inclined surface 61b and the direction (height direction) orthogonal to the ABS 70)", and X1 and X2 are expressed by the following formulas.

$$X_1 = \frac{5Ms_{SIL}t_{SIL}}{Ms_{FGL}t_{FGL}}$$

$$X_2 = \frac{16Ms_{SIL}t_{SIL}}{Ms_{FGL}t_{FGL}}$$

Figure 12:
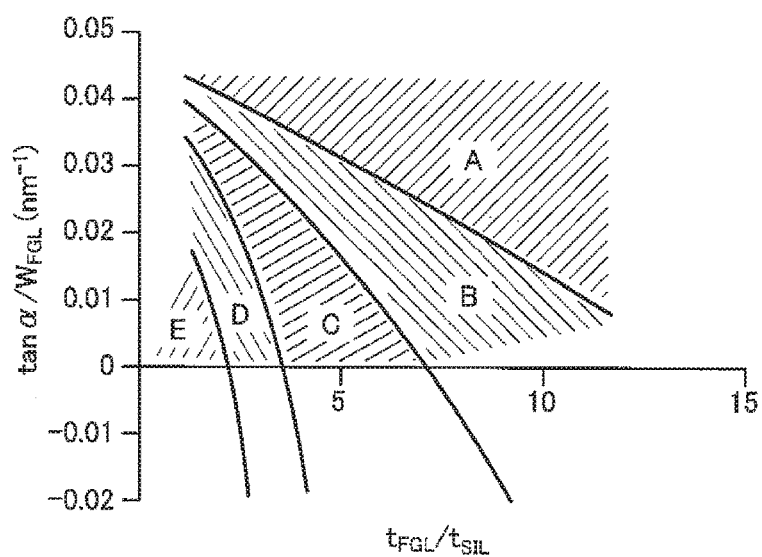
FIG. 12 is a graph showing the relationship among the degree α (deg) of the spin torque oscillator, the width $W_{FGL}$ (nm) of the magnetic field generation layer, and the film thicknesses $t_{FGL}$ (nm) and $t_{SIL}$ (nm) of the magnetic field generation layer and the spin injection layer in the embodiment of the present invention.

Furthermore, as discussed above, when the angle β is smaller than the angle γ, the length $L_{WG}$ of the write gap WG is 20 nm or less, and the film thicknesses of the buffer layer 11 and the nonmagnetic spacer layer 13 and the saturation magnetizations $Ms_{FGL}$ and $Ms_{SIL}$ of the magnetic field generation layer 12 and the spin injection layer 14 are within the desired ranges to generate a magnetic field (microwave magnetic field) of sufficient intensity from the spin torque oscillator 10, the angle α (deg), the width $W_{FGL}$ (nm) of the magnetic field generation layer 12, and the film thicknesses $t_{FGL}$ (nm) and $t_{SIL}$ (nm) of the magnetic field generation layer 12 and the spin injection layer 14 have the relationships shown in FIG. 12

In the graph shown in FIG. 12, the regions A and E are regions where the saturation magnetization $Ms_{FGL}$ and the volume $V_{FGL}$ of the magnetic field generation layer 12 and the saturation magnetization $Ms_{SIL}$ and volume $V_{SIL}$ of the spin injection layer 14 do not satisfy the relationship indicated by the above formula (3). The regions B~D are regions where the saturation magnetization $Ms_{FGL}$ and the volume $V_{FGL}$ of the magnetic field generation layer 12 and the saturation magnetization $Ms_{SIL}$ and volume $V_{SIL}$ of the spin injection layer 14 satisfy the relationship indicated by the above formula (3). In particular, the region C is a region where the relationship shown in the above formula (3) is satisfied regardless of the value of the saturation magnetization $Ms_{SIL}$ of the spin injection layer 14. When the relationships of regions B~D are satisfied, the relationships indicated by the above formulas (1-1) and (1-2) are satisfied, and when the relationship of region C is satisfied, the relationships indicated by the above formulas (2-1) and (2-2) are satisfied.

From the graph shown in FIG. 12 it can be understood that in the spin torque oscillator 10 satisfying the conditions indicated by the above formulas (2-1) and (2-2), the magnetic field generation layer 12 and the spin injection layer 14 have the relationship indicated by the above formula (3). In addition, it can be understood that when the magnetic field generation layer 12 and the spin injection layer 14 have the relationship indicated by the above formula (3), the spin torque oscillator 10 satisfies the conditions indicated by the above formulas (1-1) and (1-2). Accordingly, since the spin torque oscillator 10 satisfies the conditions indicated by the above formulas (1-1) and (1-2), and, in particular, satisfies the conditions indicated by the above formulas (2-1) and (2-2), it is possible to obtain good oscillation in the spin torque oscillator 10, and it is possible to generate a magnetic field (microwave magnetic field) of sufficient intensity.

As shown in FIG. 13, the write gap WG in this embodiment may have a shape extending substantially linearly along the cross-track direction between the main magnetic pole part 61 and the trailing shield 81. That is, the write gap WG includes a first write gap part WG1, which faces the trailing side (+Z side) end surface 61b of the main magnetic pole part 61 and is positioned roughly in the center in the cross-track direction, and a second write gap part WG2 and a third write gap part WG3, which are respectively continuous from the ends of the first write gap part WG1 in the cross-track direction and which extend to the outside along the cross-track direction. The second write gap part WG2 and the third write gap part WG3 are positioned between (between in the down-track direction) the end surface 81c of the trailing shield 81 and the end surfaces 82b and 83b of the side shields 82 and 83, respectively. The write gap WG includes the second write gap part WG2 and the third write gap part WG3, which are respectively continuous from the ends of the first write gap part WG1 in the cross-track direction and extend to the outside along the cross-track direction. Through this, it is possible to improve the magnetic field intensity Hy in the down-track direction and the recording magnetic field gradient HGy. As a result, it is possible to increase the magnetic field intensity applied on the spin torque oscillator 10 provided in the first write gap part WG1, so it is possible to increase the magnetization amplitude of the spin torque oscillator 10 and to exert sufficient interaction on the recording magnetic field by the magnetic field (for example, microwave magnetic field) generated from the spin torque oscillator 10. In addition, by improving the recording magnetic field gradient HGy, it is possible to improve the bit density (BPI).

As shown in FIG. 4, at the back side in the height direction from the ABS 70, a first back gap layer 81b, which is composed of an insulator, is positioned between the main magnetic pole layer 6 and the trailing shield 81 and electrically insulates such. A second back gap layer 84b, which is composed of an insulator, is positioned between the main magnetic pole layer 6 and the leading shield 84 and electrically insulates such.

The first coil 9a and the second coil 9b generate magnetic flux for magnetic recording on the magnetic disk 100, and, for example, are made of a highly conductive material such as copper (Cu) or the like. The first coil 9a and the second coil 9b have a winding structure (spiral structure) centered on connecting parts 81a and 84a, the first back gap layer 81b and the second back gap 84b, respectively. The first coil 9a and the second coil 9b are configured to have a two-turn loop shape connecting from one end to the other end and have a front turn part roughly on top of insulating layers IL1 and IL2, respectively. The magnetic recording head 1 according to this embodiment may be provided with a coil having a helical structure, in place of the first coil 9a and the second coil 9b having a spiral structure.

A nonmagnetic layer NML is provided via an insulating layer IL3 in a region deeper in the height direction from the front turn part of the first coil 9a and the second coil 9b. This nonmagnetic layer NML is continuously provided on top of the trailing shield 81 and reaches to the ABS 70. The nonmagnetic layer NML primarily serves the function of a protective layer.

In this embodiment, the number of turns of the first coil 9a and the second coil 9b is 2 turns, but this is not limiting, and this may be appropriately set within the range of 1~4 turns.

The first coil 9a and the second coil 9b have a plurality of turns, and an insulating layer IL4 of dry film is preferably embedded in the wound coil gaps. The dry film insulating layer IL4 is preferably composed of a material such as alumina or the like deposited with the so-called Chemical Vapor Deposition (CVD) method. To fill and form the dry film insulating layer IL4 with certainty in the coil gap, the shape of the coil is particularly important, and it is particularly preferable that the coil does not have an inverted taper shape in the depth direction.

In this embodiment, the main magnetic pole layer 6 (main magnetic pole part 61) and the trailing shield 81 are respectively connected to a drive current circuit (power source circuit) 90 to apply the drive current $I_{op}$ on the spin torque oscillator 10 via terminals 91 and 92. The drive current $I_{op}$ supplied from the drive current circuit 90, for example, flows in order of the main magnetic pole layer 6 (main magnetic pole part), the spin torque oscillator 10 and the trailing shield 81.

Since the drive current $I_{op}$ flows, spin electrons are injected into the magnetic field generation layer 12 from the spin injection layer 14. Many of the spin electrons are spin electrons polarized in the same direction as the majority spin of the spin injection layer 14. The spin electrons promote damping of the magnetization of the magnetic field generation layer 12 and hence cannot stimulate precession. However, in reality, a few spin electrons polarized in the opposite direction to the majority spin of the spin injection layer 14 are also injected into the magnetic field generation layer 12. These spin electrons polarized in the opposite direction are reflected at the magnetic field old generation layer 12 and are injected into the spin injection layer 14, and the magnetization of the spin injection layer 14 reverses. As a result, the polarization direction of the spin electrons injected into the magnetic field injection layer 12 from the spin injection layer 14 reverses. These spin electrons act to negate damping of the magnetization of the magnetic field generation layer 12 and stimulate precession of the magnetization of the magnetic field generation layer 12, so that the microwave magnetic field is generated from the magnetic field generation layer 12. This magnetic field exerts an interaction on the recording magnetic field from the main magnetic pole layer 6, making it possible to record signals on the magnetic disk 100 having large magnetic anisotropic energy Ku.

Depending on the layer composition of the spin torque oscillator 10 and the microwave magnetic field generation mechanism, the drive current $I_{op}$ may flow in the order of the trailing shield 81, the spin torque oscillator 10 and the main magnetic pole layer 6 (main magnetic pole part 61).

As described above, in the magnetic recording head 1 according to this embodiment, the width $W_{FGL}$ of the magnetic field generation layer 12 of the spin torque oscillator 10, the film thickness $t_{FGL}$ of the magnetic field generation layer 12, the film thickness $t_{SIL}$ of the spin injection layer 14 and the angle α formed by the normal line NL to the end surfaces 10d and 10e positioned at both sides of the spin torque oscillator 10 in the cross-track direction and the cross-track direction $D_{CT}$ have the relationships indicated by the above formulas (1-1) and (1-2), or t relationships indicated by the above formulas (2-1) and (2-2). Consequently, it is possible to obtain good oscillation in the spin torque oscillator 10, and it is possible to generate a magnetic field (microwave magnetic field) of sufficient intensity. Hence, it is possible to exhibit stable recording properties in the magnetic recording head 1.

The embodiment described above was described to facilitate understanding of the invention and was not described to limit the present invention. Accordingly, the various elements disclosed in the above-described embodiment should include all equivalents and design modifications that fall within the technical scope of the present invention.

The invention claimed is:

1. A magnetic recording head comprising:
    a main magnetic pole that generates a recording magnetic field applied on a magnetic recording medium from an end surface that is one portion of an air bearing surface facing the magnetic recording medium;
    a trailing shield provided on the trailing side of the main magnetic pole with a write gap interposed therebetween; and
    a spin torque oscillator that is provided in the write gap interposed between the main magnetic pole and the trailing shield, wherein the spin torque oscillator generates a magnetic field that exerts an interaction on the recording magnetic field applied to the magnetic recording medium;

wherein, among the end surfaces of the main magnetic pole, the end surface positioned on the trailing side is configured by an inclined surface that is inclined toward the trailing side from the air bearing surface toward the back in the height direction;

the spin torque oscillator is a laminated body in which at least a magnetic field generation layer, a nonmagnetic spacer layer and a spin injection layer are laminated in this order from the main magnetic pole side;

the length of the write gap in the down-track direction when viewed from the air bearing surface side is 20 nm or less; and a width $W_{FGL}$ (nm) in the cross-track direction of the end surface facing the main magnetic pole, among the end surfaces of the magnetic field generation layer, a film thickness $t_{FGL}$ (nm) of the magnetic field generation layer, a film thickness $t_{SIL}$ (nm) of the spin injection layer and an angle α (deg) formed by the cross-track direction and a normal line to the end surfaces of the laminated body positioned on both sides in the cross-track direction when viewing the laminated body from the air bearing surface side have relationships indicated by the following formula (1-1) and formula (1-2):

$$\tan\alpha/W_{FGL} \geq -1.72 \times 10^{-2} \times (t_{FGL}/t_{SIL})^2 + 2.95 \times 10^{-2} \times t_{FGL}/t_{SIL} + 9.60 \times 10^{-3} \quad (1\text{-}1)$$

$$\tan\alpha/W_{FGL} \leq -3.32 \times 10^{-5} \times (t_{FGL}/t_{SIL})^2 - 2.87 \times 10^{-3} \times t_{FGL}/t_{SIL} + 4.69 \times 10^{-2} \quad (1\text{-}2).$$

2. The magnetic recording head according to claim 1, wherein a saturation magnetization $Ms_{FGL}$ and volume $V_{FGL}$ of the magnetic field generation layer and a saturation magnetization $Ms_{SIL}$ and volume $V_{SIL}$ of the spin injection layer have a relationship indicated by the following formula (3):

$$5 \leq \frac{Ms_{FGL}V_{FGL}}{Ms_{SIL}V_{SIL}} \leq 16. \quad (3)$$

3. The magnetic recording head according to claim 1, wherein an angle β (deg), which is formed by the end surface facing the air bearing surface, among the end surfaces of the laminated body, and a normal line to the inclined surface of the main magnetic pole, is smaller than an inclined angle γ (deg) of the inclined surface to a direction orthogonal to the air bearing surface.

4. The magnetic recording head according to claim 1, wherein a saturation magnetization $Ms_{SIL}$ of the spin injection layer is 1 T or greater.

5. The magnetic recording head according to claim 1, wherein the length of the write gap in the down-track direction when viewed from the air bearing surface side is 18 nm or less.

6. The magnetic recording head according to claim 1, further comprising a drive current controller capable of applying a drive current on the spin torque oscillator toward the spin injection layer from the magnetic field generation layer.

7. A magnetic recording head comprising:

a main magnetic pole that generates a recording magnetic field applied on a magnetic recording medium from an end surface that is one portion of an air bearing surface facing the magnetic recording medium;

a trailing shield provided on the trailing side of the main magnetic pole with a write gap interposed therebetween; and a spin torque oscillator that is provided in the write gap interposed between the main magnetic pole and the trailing shield, wherein the spin torque oscillator generates a magnetic field that exerts an interaction on the recording magnetic field applied to the magnetic recording medium;

wherein, among the end surfaces of the main magnetic pole, the end surface positioned on the trailing side is configured by an inclined surface that is inclined toward the trailing side from the air bearing surface toward the back in the height direction;

the spin torque oscillator is a laminated body in which at least a magnetic field generation layer, a nonmagnetic spacer layer and a spin injection layer are laminated in this order from the main magnetic pole side;

the length of the write gap in the down-track direction when viewed from the air bearing surface side is 20 nm or less; and a width $W_{FGL}$ (nm) in the cross-track direction of the end surface facing the main magnetic pole, among the end surfaces of the magnetic field generation layer, a film thickness $t_{FGL}$ (nm) of the magnetic field generation layer, a film thickness $t_{SIL}$ (nm) of the spin injection layer and an angle α (deg) formed by the cross-track direction and a normal line to the end surfaces of the laminated body positioned on both sides in the cross-track direction when viewing the laminated body from the air bearing surface side have relationships indicated by the following formula (2-1) and formula (2-2):

$$\tan\alpha/W_{FGL} \geq -2.50 \times 10^{-3} \times (t_{FGL}/t_{SIL})^2 - 1.98 \times 10^{-3} \times t_{FGL}/t_{SIL} + 4.16 \times 10^{-2} \quad (2\text{-}1)$$

$$\tan\alpha/W_{FGL} \leq -4.50 \times 10^{-4} \times (t_{FGL}/t_{SIL})^2 - 3.39 \times 10^{-3} \times t_{FGL}/t_{SIL} 4.49 \times 10^{-2} \quad (2\text{-}2).$$

8. The magnetic recording head according to claim 7, wherein the a saturation magnetization $Ms_{FGL}$ and volume $V_{FGL}$ of the magnetic field generation layer, and a saturation magnetization $Ms_{SIL}$ and the volume $V_{SIL}$ of the spin injection layer, have a relationship indicated by the following formula (3):

$$5 \leq \frac{Ms_{FGL}V_{FGL}}{Ms_{SIL}V_{SIL}} \leq 16. \quad (3)$$

9. The magnetic recording head according to claim 7, wherein an angle β (deg), which is formed by the end surface facing the air bearing surface, among the end surfaces of the laminated body, and a normal line to the inclined surface of the main magnetic pole, is smaller than an inclined angle γ (deg) of the inclined surface to a direction orthogonal to the air bearing surface.

10. The magnetic recording head according to claim 7, wherein a saturation magnetization $Ms_{SIL}$ of the spin injection layer is 1 T or greater.

11. The magnetic recording head according to claim 7, wherein the length of the write gap in the down-track direction when viewed from the air bearing surface side is 18 nm or less.

12. The magnetic recording head according to claim 7, further comprising a drive current controller capable of applying a drive current on the spin torque oscillator toward the spin injection layer from the magnetic field generation layer.

13. A head gimbal assembly comprising:
    the magnetic recording head according to claim 1; and
    a suspension that supports the magnetic recording head.

14. A head gimbal assembly comprising:
    the magnetic recording head according to claim 7; and
    a suspension that supports the magnetic recording head.

15. A magnetic recording apparatus comprising:
    a magnetic recording medium;
    the magnetic recording head according to claim 1; and
    a position-determining apparatus that supports the magnetic recording head and determines position relative to the magnetic recording medium.

16. A magnetic recording apparatus comprising:
    a magnetic recording medium;
    the magnetic recording head according to claim 7; and
    a position-determining apparatus that supports the magnetic recording head and determines position relative to the magnetic recording medium.

\* \* \* \* \*